2,880,393

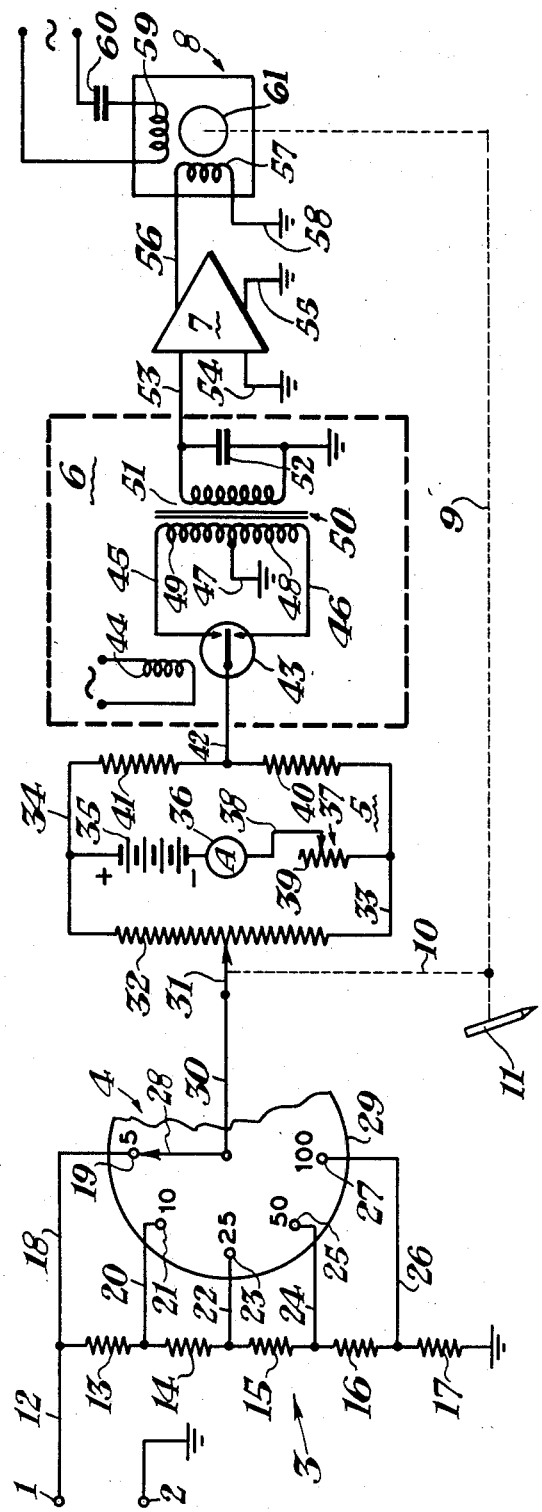

INSTRUMENT CALIBRATION CIRCUIT

Eugene S. Cornish, Enid, Okla., assignor to George E. Failing Company, Enid, Okla., a corporation of Delaware Application May 9, 1956, Serial No. 583,835

2 Claims. (Cl. 324—100)

This application relates to instrument calibration circuits, and particularly to an improved calibration circuit for recording voltmeters of the rebalancing type.

In the measuring and recording art, it has become common to transform variable quantites to be measured into voltages which may be measured and recorded by standardized rebalancing voltmeters. For example, in the well logging field, it is known to measure the resistivity of rock formations, and the values of self-potentials naturally occurring in such formations, by generating voltages analogous to these quantities and measuring and recording these voltages by a suitable voltage responsive means. One example of an improved form of such apparatus is shown in the copending application for Letters Patent of the United States of Eugene S. Cornish and Donald E. Stark, Serial No. 583,673, filed on the same day as the present application, for Electrical Well-Logging Apparatus. In this, as well as in other instances familiar to those skilled in the art, the range of voltages which it is desired to measure and record may vary quite widely over a substantial range. Recorded graphs of such voltages are, therefore, likely to be on too small a scale for suitable accuracy or on too large a scale for the recording chart or strip furnished with the instrument. It is known in the art to solve this problem approximately by providing a range stepping switch at the input terminals of the voltage recording instrument, so that selected fractions of an input voltage applied to the instrument may be tapped off for actual measurement. However, while such an arrangement may be roughly satisfactory, it would be desirable to provide means for varying the sensitivity of such a measuring or recording instrument continuously over its range of response. Accordingly, it is an object of my invention to provide an improved calibration circuit for instruments of the type described which provides for a plurality of coarse step-wise sensitivity adjustments, and in addition provides means for continually adjusting the sensitivity of the instrument between the steps.

It is a particular object of my invention to provide, in a voltmeter of the rebalancing type having a signal generating bridge and means for adjusting said bridge to produce an output equal and opposite to that of an applied input, a range stepping switch for selecting portions of an applied voltage to be connected to said bridge, and means for varying the current flow through the bridge to continuously vary the movement required to balance the bridge in response to a given applied voltage.

Other objects and further advantages of my invention will be apparent to those skilled in the art as the description proceeds.

According to one embodiment of my invention, the above and other objects of my invention are carried out by providing, in a recording voltmeter of the rebalancing type, which has a range stepping switch and a rebalancing bridge connected through an amplifier to control a servomotor which rebalances the bridge and simultaneously moves the recording pen on a suitable chart, indicia associated with the various positions of the range stepping switch comprising numbers proportional to the ratio of an applied voltage to the portion selected in the particular position of the switch, and by providing in the signal bridge a variable impedance for adjusting the current flow through the power supply arm of the bridge, and an ammeter in the power supply arm of the bridge, so that the sensitivity of the recording pen in millivolts of applied voltage per inch of deflection of the pen may be represented directly by the product of the selected indicia and the reading of the ammeter, and so that the sensitivity so measured may be continuously adjusted by variation of the variable impedance and may be adjusted in steps by adjustment of the range stepping switch.

I shall first describe one embodiment of my invention, and shall then point out the novel features thereof in claims.

The drawing comprises a single view showing a schematic diagram of one embodiment of my invention.

Referring to the drawing, a rebalancing voltmeter of the recording type is shown, which includes a pair of terminals 1 and 2 which are adapted to be connected to an external circuit under test, or to any source of voltage to be measeured. Terminals 1 and 2 are connected across a potentiometer 3. Various combinations of resistors in the potentiometer may be selected by a range switch 4, for application to a bridge 5. The algebraic sum of the portion of the voltage across potentiometer 3 selected by switch 4 and the voltage across bridge 5 is applied through a suitable modulator 6 to a conventional amplifier 7. Amplifier 7 controls one winding of a suitable servomotor 8, which drives a recording pen 11 through a connection 9 and simultaneously rebalances a wiper on bridge 5 through connection 10, as schematically indicated.

Input terminal 2 is connected to a reference ground, which may be the chassis of the instrument. Input terminal 1 is connected over lead 12 to one terminal of resistor 13 in potentiometer 3. Resistor 13 is connected in series with resistors 14, 15, 16 and 17 to ground as shown, and is thus returned to input terminal 2. The values of resistances 13 through 17 may, for example, be as follows: Resistance 13, 1000 ohms; resistance 14, 600 ohms; resistance 15, 200 ohms; resistance 16, 100 ohms; and resistance 17, 100 ohms.

Range switch 4 has a first terminal 19 connected to the top of potentiometer 3 over lead 18. A second terminal 21 is connected between resistors 13 and 14 by lead 20. A third terminal 23 is connected between resistors 14 and 15 by lead 22. A fourth terminal 25 is connected between resistors 15 and 16 by lead 24. A fifth terminal 27 is connected between resistors 16 and 17 by lead 26. Switch 4 includes an arm 28 which is rotatable for engagement with any of terminals 19, 21, 23, 25 and 27.

Suitable indicia are associated with each of the terminals, as by marking the indicia on a suitable plate such as 29 mounted on or forming part of the exterior of the instrument. These indicia are, in the embodiment shown, the numeral 5 associated with terminal 19, the numeral 10 associated with terminal 21, the numeral 25 associated with terminal 23, the numeral 50 associated with terminal 25, and the numeral 100 associated with terminal 27. It will be apparent that these numerals are in the proportions 1:2:5:10:20, and numbers in this ratio are deliberately selected for a purpose to be described.

Arm 28 of switch 4 is connected to input wiper 31 of bridge 5 over lead 30. Wiper 31 is movable along resistor 32 for a puropse to be described. Resistor 32 is connected across a source of voltage 35 by a circuit including lead 33, variable impedance 37, ammeter 36, battery 35, and lead 34 to the other terminal of resistor 32. An output terminal for bridge 5 is constructed by connecting resistors 40 and 41 in series across leads 33 and 34 and connecting an output lead 42 between resistors 40 and 41 as shown. Variable impedance 37 includes a wiper 38 movable along a resistance 39 for a purpose to be described.

Output terminal 42 of bridge 5 is connected to the input of a suitable conventional modulator 6, which comprises a conventional vibrator 43 excited by a suitable winding 44 connected to a source of alternating voltage, as indicated, and a transformer 50 connected across the output terminals of vibrator 43. Transformer 50 comprises an input primary winding connected between output leads 45 and 46 of vibrator 43. A center tap 47, which is connected to ground as shown, divides the primary winding of transformer 50 into two coil sections 48 and 49. A secondary winding 51 and a suitable tuning condenser 52 are connected in parallel at the output side of transformer 50.

Alternating voltages appearing between output lead 53 of modulator 6 and ground are applied between terminal 53 of amplifier 7 and ground terminal 54. Amplifier 7 may be of any conventional type, but in the circuit shown would comprise a conventional polarity discriminating amplifier energized by a source of alternating voltage in phase with the source exciting winding 44 of vibrator 43, and producing an output voltage in phase or 180° out of phase with the source voltage depending upon the phase of the signal appearing at lead 53. Since such amplifiers are well known in the art, amplifier 7 will not be described in further detail.

Amplifier 7 has an output terminal 55 which is grounded as shown and an output lead 56 which is connected through winding 57 of motor 8 to ground at 58. Motor 8 may comprise a suitable conventional alternating current motor, which has a control winding 57 and an energized winding 59 connected through a phasing capacitor 60 to a suitable source of alternating current in phase with the source of voltage applied to the coil 44 of vibrator 43. Rotor 61 of motor 8 will accordingly rotate in a clockwise or counterclockise direction, according to principles well known in the art, depending upon whether the voltage applied across winding 57 from amplifier 7 is in phase or 180° out of phase with the voltage applied to winding 59 of motor 8.

An output shaft shown schematically at 9 is driven by rotor 61 of motor 8 to position a conventional recording pen 11. An additional connection 10 from shaft 9 is connected as shown to position wiper 31 on bridge 5.

Having described the structure of this embodiment of my invention, I will now describe its operation. The operation will first be described on the assumption that the reading of ammeter A is a fixed value having the relative amplitude of 1 and that switch 4 is in the position shown with arm 28 engaging terminal 19.

Assuming that an input voltage of, say, 5 millivolts is applied across terminals 1 and 2, the full voltage will be applied over leads 12 and 18 through terminal 19 and arm 28 of switch 4, and over lead 30 to wiper 31 of bridge 5. With wiper 31 in its central position as shown, no voltage will appear between wiper 31 and output terminal 42, since the bridge is balanced in this condition due to considerations well understood in the art. Initially, then, the input signal of 5 millivolts will appear at lead 42 and be applied to vibrator 43. Due to the known action of such vibrators, the input voltage is applied alternately to leads 45 and 46 which are connected across the primary winding of transformer 50. Since this voltage is alternately applied to sections 49 and 48 of the primary of transformer 50, pulses of alternating current will be induced in secondary winding 51, and due to the cumulative action of windings 48 and 49, as is well known in the art, such pulses will appear as a full wave alternating current across winding 51. As will be apparent to those skilled in the art, this voltage will be in phase or 180° out of phase with the source of voltage connected to winding 44 of vibrator 43 according as the voltage applied to lead 42 is positive or negative with respect to ground.

The voltage appearing across secondary winding 51 and applied to lead 53 of amplifier 7 will energize the amplifier in the maner previously described to produce an output voltage between output leads 55 and 56 of amplifier 7 which is in phase or out of phase with the reference source depending on the polarity of the input to vibrator 43. This voltage will accordingly energize winding 57 of motor 8 to rotate the motor clockwise or counterclockwise depending upon the polarity of the input signal. Assuming that for a positive voltage the rotation of motor 8 is clockwise, output shafts 9 and 10 will be arranged to operate in response to clockwise rotation to drive wiper 31 downward on resistor 32 to produce a negative potential opposing the input signal between wiper 31 and lead 42. Motor 8 will continue to move until wiper 31 has moved to a position which establishes a voltage across the bridge equal and opposite to the applied input voltage.

The distance through which wiper 31 is moved for this purpose is obviously determined by the resistance per unit length of resistor 32 and the current flowing through the resistor. The current flowing through the resistor is equal to that indicated by ammeter 36 minus that flowing through resistors 40 and 41 in the opposite branch of the bridge. In one practical embodiment, the parts are so proportioned that with ammeter 36 reading one unit of current flow as assumed, it will require one inch of movement of wiper 31 along resistor 33 to balance an input signal of 5 millivolts. Recording pen 11 will accordingly move one inch from the datum point to indicate the voltage applied. Accordingly, it may be said that the sensitivity of pen 11 is 5 millivolts per inch. It will be noted that this value is indicated by the number 5 associated with terminal 19 on switch 4.

Next, assume that the same signal voltage of 5 millivolts is applied across terminals 1 and 2, but that switch 4 is moved to the 10 position with arm 28 engaging terminal 21. The voltage appearing between lead 30 and ground will accordingly be equal to the input voltage, 5 millivolts, multiplied by the resistance between terminal 21 and ground, or 1000 ohms in the embodiment shown, divided by the total resistance of potentiometer 3, or 2000 ohms, which gives a value of 2.5 millivolts applied to lead 30. The previously described rebalancing operation will take place, and since this operation has been described and is in any event largely conventional, it will not be repeated. However, it will be apparent that if wiper 31 moves one inch to balance an applied signal of 5 millivolts, it will only move 0.5 inch to balance a signal of 2.5 volts applied to lead 30. Accordingly, in this case, pen 11 will only move 0.5 inch. Since the input voltage is the same, or 5 millivolts, the output sensitivity in millivolts per inch is therefore 10 millivolts per inch. It will be noted that this number is that associated with terminal 21 on switch 4.

From the above considerations, it will be apparent that with arm 28 in the position engaging terminal 23 on switch 4, the input signal will be attenuated by the ratio of the resistance between terminal 23 and ground to the resistance of potentiometer 3, or 400 to 2000 equals one-fifth. Since wiper 31 will only move one-fifth of an inch in this case, the sensitivity of pen 11 will therefore be twenty-five millivolts per inch. The resistance between terminal 25 and ground is 200 ohms, so that the ratio of this resistance to the total resistance of potentiometer 3 is one-tenth. The sensitivity in the instrument in this position will then be 50 millivolts per inch. In the last position of wiper 28 engaging terminal 27, the ratio of the resistance between terminal 27 and ground to the total potentiometer resistance is one-twentieth, so that from the above considerations the sensitivity of the instrument with the switch in this position is 100 millivolts per inch.

The operation of this embodiment of my invention has been described above on the assumption that the current through source 35 as indicated by ammeter 36 was one unit of current flow. However, it can be shown that the movement of wiper 31 on resistor 32 necessary to produce a given output voltage between terminals 31 and 42 of bridge 5 is inversely proportional to the current indicated by ammeter A. Therefore, since the sensitivity of the instrument in millivolts per inch is inversely proportional to the movement of wiper 31 in inches per millivolt of input signal, the sensitivity of the instrument is directly proportional to the current indicated by ammeter 36. Accordingly, if, for example, the input signal voltage was 5 millivolts, arm 28 of switch 4 was in engagement with terminal 19 in the 5 millivolt per inch position of switch 4, and wiper 38 of variable impedance 37 was adjusted on resistor 39 until ammeter 36 read eight tenths of a unit of current, the sensitivity of the unit would be eight tenths times 5, or 4 millivolts per inch. It can be shown in general that the sensitivity S of the instrument in millivolts of input signal applied to terminals 1 and 2 per inch of deflection of wiper 31 and pen 11 is equal to TI where T is the ratio of the total impedance of potential divider 3 to the portion of that impedance selected by switch 4 and I is the current through ammeter 36. It will be apparent from this consideration that if ammeter 36 is adjustable from one unit of current flow through two tenths of a unit, the sensitivity of the instrument in the 5 position of switch 4 may be continuously adjusted from 5 millivolts per inch through 1 millivolt per inch, in the 10 position it can be adjusted from 10 to 2 millivolts per inch, in the 25 position it can be adjusted from 25 to 5 millivolts per inch, in the 50 position it can be adjusted from 50 to 10 millivolts per inch, and in the 100 position it can be adjusted from 100 to 20 millivolts per inch. Therefore, it is apparent that I have provided a calibration circuit for continuously adjusting the sensitivity of an instrument of the type described in steps over a range and continuously between steps within the range, and that I have accordingly provided for continuous sensitivity adjustment over the entire range of the instrument.

While I have described but a single embodiment of my invention, many changes and modifications will be apparent to those skilled in the art upon reading this description. Accordingly, I do not wish to be limited to the details shown, but only by the scope of the following claims.

Having thus described my invention, what I claim is:

1. A calibration circuit for a recording voltmeter of the type including a servomotor for actuating an indicator of the voltmeter, a modulator having a voltage input, and a polarity discriminating amplifier connecting the modulator with the servomotor for supplying alternating voltages of amplitude for actuating the indicator, said calibration circuit including a potentiometer having terminals for connection of an electric current source of variable voltage to be measured and having a series of resistances in series connection across said terminals, a range switch having a corresponding series of related contacts with each related contact being connected with one end of its related resistance and having a movable contact member adapted to engage any one of the contacts for selecting in steps portions of the voltages over the range of the current, a resistor, a wiper movable along the resistor and having connection with the movable contact member to apply the selected part of the voltage to the resistor, a pair of series connected resistors, means connecting the first named resistor in parallel with the series connected resistors to provide a bridge circuit, means connecting the junction of the series connected resistors with the voltage input of the modulator, an independent source of electrical current, an ammeter, an impedance, said independent source of electrical current and ammeter being connected in series with the impedance across the bridge circuit between the first named resistor and the series connected resistors to supply a current having a unit voltage to the bridge in opposition to the selected part of the voltage applied through the wiper to supply the input voltage to the modulator for effecting actuation of the servomotor, an operating connection between the servomotor and the movable wiper to move the wiper along the resistor until the applied voltage is equal to the opposed unit voltage to provide step adjustment of sensitivity of the voltmeter over said range, and means for adjusting the impedance downwardly from the unit voltage to provide adjustment of the sensitivity of the voltmeter continuously between steps within the range.

2. A calibration circuit for a recording voltmeter of the type including a servomotor for actuating an indicator of the voltmeter, a modulator having a voltage input, and a polarity discriminating amplifier connecting the modulator with the servomotor for supplying alternating voltages of amplitude for actuating the indicator, said calibration circuit including a potentiometer having terminals for connection of an electric current source of variable voltage to be measured and having a series of resistances in series connection across said terminals, a range switch having a corresponding series of related contacts with each related contact being connected with one end of its related resistance and having a movable contact member adapted to engage any one of the contacts for selecting in steps portions of the voltages over the range of the current, indicia associated with the contacts comprising numbers proportional to the ratio of an applied voltage to the portion selected by engagement of the movable contact member with the respective contacts, a resistor, a wiper movable along the resistor and having connection with the movable contact member to apply the selected part of the voltage to the resistor, a pair of series connected resistors, means connecting the first named resistor in parallel with the series connected resistors to provide a bridge circuit, means connecting the junction of the series connected resistors with the input of the modulator, an independent source of electrical current, an ammeter, a variable impedance, said independent source of electric current and ammeter being connected in series with the impedance across the bridge circuit between the first named resistor and the series connected resistors to supply a current having a unit voltage to the bridge in opposition to the selected part of the voltage applied through the wiper to supply the input voltage to the modulator for effecting actuation of the servomotor, and an operating connection between the servomotor and the movable wiper to deflect the wiper along the resistor until the applied voltage is equal to the unit voltage to provide step adjustment of sensitivity of the voltmeter over a range, said elements of the bridge circuit being proportional so that sensitivity of the indicator in millivolts of applied voltage per a unit of deflection of the wiper is represented directly by the product of the selected indicia and a reading of the ammeter.

References Cited in the file of this patent

UNITED STATES PATENTS

| | | |
|---|---|---|
| 2,445,816 | Abbott | July 27, 1948 |
| 2,478,966 | Gilbert | Aug. 16, 1949 |
| 2,565,498 | Goodwin | Oct. 20, 1953 |
| 2,792,542 | Robinson | May 14, 1957 |

OTHER REFERENCES

Article by W. J. Hantz, published in Radio and Television News, December 1953, page 161. (Copies available in Scientific Library and 324-130.)